United States Patent
Sakakibara

(10) Patent No.: US 8,339,624 B2
(45) Date of Patent: Dec. 25, 2012

(54) IMAGE PROCESSING APPARATUS, AND METHOD OF DISPLAYING MESSAGES IN PLURAL LANGUAGES

(75) Inventor: Masahito Sakakibara, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 872 days.

(21) Appl. No.: 12/261,859

(22) Filed: Oct. 30, 2008

(65) Prior Publication Data
US 2009/0262387 A1  Oct. 22, 2009

(30) Foreign Application Priority Data
Apr. 18, 2008 (JP) ................... 2008-108705

(51) Int. Cl.
*G06F 3/12* (2006.01)
*G06F 17/20* (2006.01)

(52) U.S. Cl. ............ 358/1.13; 358/1.15; 704/8; 700/83; 715/703; 399/80; 399/81

(58) Field of Classification Search ........ 358/1.13–1.15; 704/8; 399/80, 81; 700/83; 715/713
See application file for complete search history.

(56) References Cited

U.S. PATENT DOCUMENTS

| | | | |
|---|---|---|---|
| 6,205,418 B1 * | 3/2001 | Li et al. ............................. | 704/8 |
| 6,873,806 B2 * | 3/2005 | Kobayashi et al. ............. | 399/80 |
| 7,082,574 B2 * | 7/2006 | Ogino et al. .................... | 715/764 |
| 7,154,618 B2 * | 12/2006 | Kadowaki ..................... | 358/1.13 |
| 7,185,289 B1 | 2/2007 | Taima | |
| 7,284,061 B2 * | 10/2007 | Matsubayashi et al. ....... | 709/229 |
| 2002/0075510 A1 * | 6/2002 | Martinez ...................... | 358/1.15 |
| 2003/0133041 A1 * | 7/2003 | Curtis et al. .................. | 348/462 |
| 2004/0156071 A1 | 8/2004 | Lay et al. | |
| 2005/0185215 A1 * | 8/2005 | Nishizawa et al. .......... | 358/1.15 |
| 2005/0264830 A1 | 12/2005 | Une et al. | |
| 2008/0244397 A1 * | 10/2008 | Ferlitsch ...................... | 715/703 |
| 2010/0225959 A1 * | 9/2010 | Selvaraj et al. .............. | 358/1.15 |

FOREIGN PATENT DOCUMENTS

JP  2002-7024 A  1/2002
(Continued)

OTHER PUBLICATIONS

Australian Office Action in counterpart Australian application No. 2009201016, dated Feb. 25, 2010.
Australian Office Action in counterpart Australian application No. 2009201016, dated Jul. 7, 2010.
Office Action dated Apr. 27, 2012 issued by the Korean Intellectual Property Office in counterpart Korean Application No. 10-2008-0124180.

*Primary Examiner* — Twyler Haskins
*Assistant Examiner* — Dennis Dicker
(74) *Attorney, Agent, or Firm* — Sughrue Mion, PLLC

(57) ABSTRACT

An image processing apparatus has a function of processing a plurality of jobs in parallel. The image processing apparatus includes a job processing section, a language information receiving section, a job managing section and a display controlling section. The job processing section processes each job. The language information receiving section receives language information relating to each job. The job managing section manages the plurality of jobs while associating each job with the language information relating to each job. The display controlling section displays display information relating to each job in a language corresponding to the language information relating to each job.

16 Claims, 2 Drawing Sheets

60: JOB LIST

| JOB NUMBER | JOB TYPE | USER NAME | LANGUAGE |
|---|---|---|---|
| 001 | PRINT | USER A | JAPANESE |
| 002 | SCAN | USER B | ENGLISH |
| 003 | FAX TRANSMISSION | USER C | CHINESE |
| ⋮ | | | |

FOREIGN PATENT DOCUMENTS

| | | |
|---|---|---|
| JP | 2002-73241 A | 3/2002 |
| JP | 2003-209643 A | 7/2003 |
| JP | 2004-050701 A | 2/2004 |
| JP | 2004-110214 A | 4/2004 |
| JP | 2004-318427 A | 11/2004 |
| JP | 2006-321190 A | 11/2004 |
| JP | 2005-151415 A | 6/2005 |
| JP | 2006103151 A | 4/2006 |
| JP | 2007-90757 A | 4/2007 |
| KR | 10-2007-0122017 A | 12/2007 |

OTHER PUBLICATIONS

Communication dated Jul. 17, 2012 issued by the Japanese Patent Office in counterpart Japanese Application No. 2008-108705.

* cited by examiner

FIG. 2

60 : JOB LIST

| JOB NUMBER | JOB TYPE | USER NAME | LANGUAGE |
|---|---|---|---|
| 001 | PRINT | USER A | JAPANESE |
| 002 | SCAN | USER B | ENGLISH |
| 003 | FAX TRANSMISSION | USER C | CHINESE |
| ⋮ | | | |

IMAGE PROCESSING APPARATUS, AND METHOD OF DISPLAYING MESSAGES IN PLURAL LANGUAGES

CROSS-REFERENCE TO RELATED APPLICATIONS

This application is based on and claims priority under 35 USC 119 from Japanese Patent Application No. 2008-108705 filed Apr. 18, 2008.

BACKGROUND

1. Technical Field

The invention relates to an image processing apparatus, an image processing method, a computer-readable medium and a computer data signal.

2. Related Art

An image processing apparatus having a printing function and so on has been known. Particularly, a multifunction type device having many functions such as a scanner function and a facsimile function in addition to the printing function has been installed not only in offices but also in shops for wide use.

A multifunction-type image processing apparatus of a related art has a language switching button having, for example, an indication "Language", on a control panel. The multifunction-type image processing apparatus has such a function that, when a user presses the language switching button, a language displayed in a user interface (UI) screen is switched. In this case, a display language switching command is maintained until the control panel is returned to an initial state by a certain trigger, for example.

Moreover, of multifunction-type image processing apparatuses of a related art, one receives a job such as a print job from an external computer or the like through a network. A local operator who stands in front of the image processing apparatus to use the control panel is a user who uses an image input section (a scanner section) for scanning, faxing, copying, etc. A network print or the like is input from a remote terminal, and processed in a background to be output irrespective whether or not the user is present in front of the image processing apparatus. Therefore, even if an error message caused by the job, such as a print job, which is being carried out in the background, is displayed in the display language which is designated from the control panel at that time, it is not deemed as a problem.

However, because IC card authentication print is recently introduced for the purpose of preventing information leakage caused by leaving output paper, network printing or the like is also carried out through a local operation that uses the control panel. Accordingly, due to parallel processing and/or parallel local operation of the functions which utilize different resources of the image processing apparatus such as scanning (IIT) and printing (IOT), or due to a change of an authentication state while the print job is being processed described above, there happens such a change of situation that the display language which is set on the image processing apparatus at a time when an error occurs is different from the display language which is expected by an owner of the job in which the error occurs, even though the owner is present in front of the image processing apparatus.

It is not a general idea to identify an individual as an owner, for each job. Therefore, whichever of a magnetic card and a personal certification card is used, they are used only for judging as to whether or not its owner is allowed to use the functions of the image processing apparatus. Some system is designed so as to identify an owner for each job for a particular purpose such as billing. However, in this case, it has been a usual manner to stop multitask function (parallel processing) for facilitating error control.

SUMMARY

According to an aspect of the invention, an image processing apparatus has a function of processing a plurality of jobs in parallel. The image processing apparatus includes a job processing section, a language information receiving section, a job managing section and a display controlling section. The job processing section processes each job. The language information receiving section receives language information relating to each job. The job managing section manages the plurality of jobs while associating each job with the language information relating to each job. The display controlling section displays display information relating to each job in a language corresponding to the language information relating to each job.

BRIEF DESCRIPTION OF THE DRAWINGS

Exemplary embodiments of the invention will be described in detail based on the following figures, wherein:

FIG. 2 is a view for explaining a job list.

DETAILED DESCRIPTION

Figure 1:
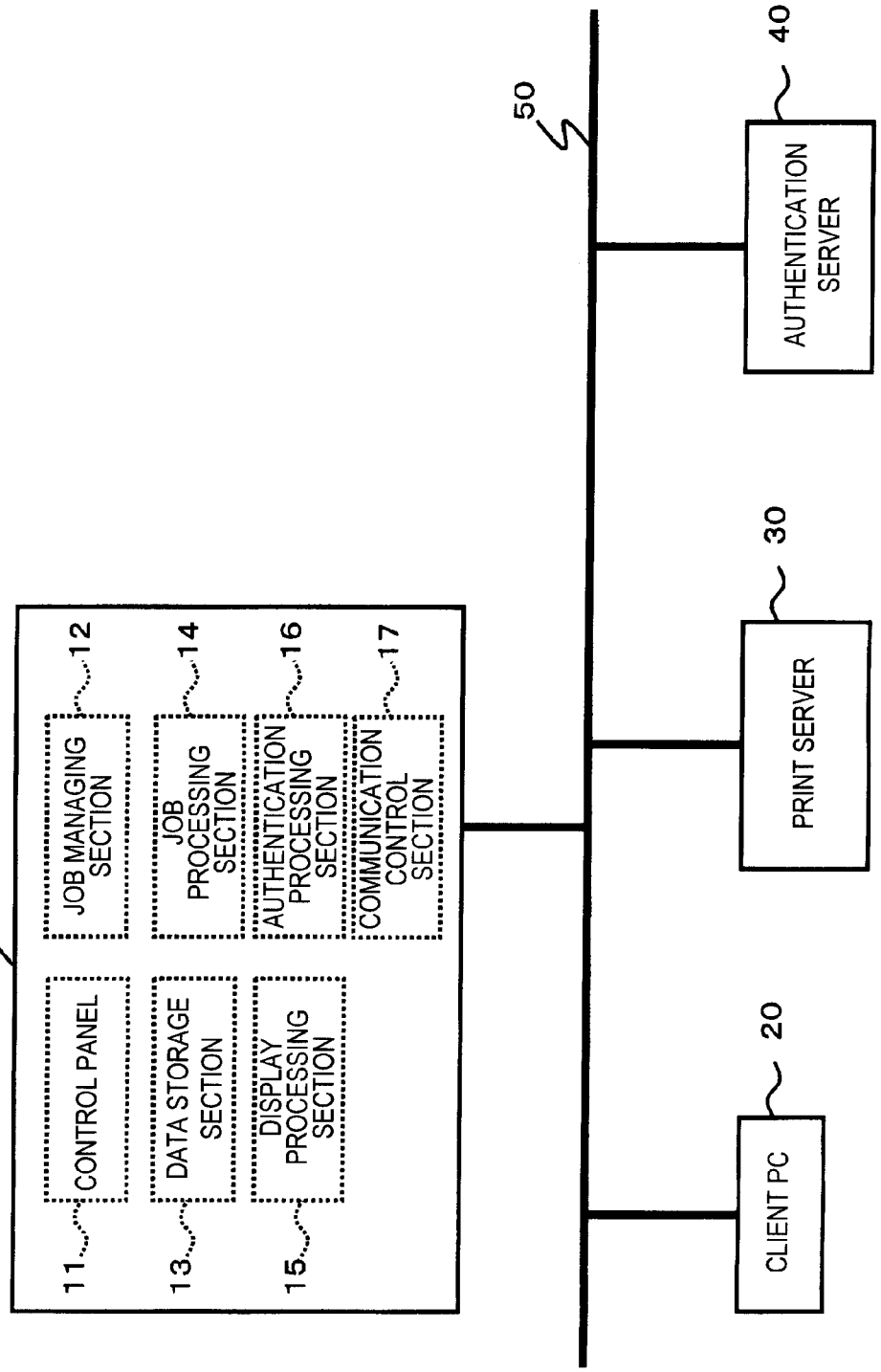
FIG. 1 is a view showing the schematic configuration of a system including an image processing apparatus according to an exemplary embodiment of the invention.

Now, exemplary embodiments of the invention will be described.

FIG. 1 shows an image processing apparatus according to an exemplary embodiment of the invention. FIG. 1 is a view showing the schematic configuration of a system including an image processing apparatus 10. The image processing apparatus 10 has at least one function out of a printing function, a copying function, a scanning function, a faxing function, an image date processing function, etc., for example. Particularly, a multifunction type device having multiple functions out of these plural functions is an example of the image processing apparatus 10.

A job such as printing, copying and scanning is processed in a job processing section 14. The job processing section 14 has: a reading module for converting a signal obtained by optically reading an original image which is recorded on a medium such as paper and film into digital data to thereby obtain image data; and a printing module for printing an image corresponding to, for example, the image data obtained by the reading module, on a medium such as paper for output. The reading module and the printing module are adequately controlled according to a job to thereby realize the printing function and the copying function.

The image processing apparatus 10 has a multitask function in which parts of the apparatus for conducting processing functions such as an image input section and a print outputting section process plural jobs, which don't overlap, in parallel. For example, the image processing apparatus has such function as receiving a print output job through a network and carrying out a print job in the print output section, while a scanned image is being input. Also, it is assumed that, in a copying job, the print output section outputs an image, which is scanned by the image input section. The image processing apparatus may have such a function as carrying out a process of inputting a scanned image of a next copying job during a process of printing and outputting a scanned and input image of the current copying job if the process in the image input section has been completed. In this exemplary embodiment, plural jobs which are processed in parallel are managed so that each job is associated with a language relating to each job.

As shown in FIG. 1, the image processing apparatus 10 of this exemplary embodiment is connected to a client PC 20, a print server 30, an authentication server 40, and so on through a network 50. Although the image processing apparatus 10 can be used as a member of the system, it is also possible to use the image processing apparatus 10 as a stand-alone apparatus. When the image processing apparatus 10 is used as a stand-alone apparatus, the client PC 20, the print server 30, the authentication server 40, and the network 50 may be omitted from the configuration shown in FIG. 1. Further, a communication control section 17 in the image processing apparatus 10 may be omitted.

When the image processing apparatus 10 is used as a stand-along apparatus, a user inputs a command for a function such as printing, copying and scanning through a control panel 11. A user interface screen (UI screen) is displayed on the control panel 11, and provided with a touch panel function in which a button display or so formed in the UI screen is operated by a user's finger or the like. The user selects a desired job by operating buttons corresponding to the functions such as printing, copying and scanning which are displayed in the UI screen.

In this exemplary embodiment, the user selects a language for each job. For example, a language switching button is provided in the UI screen displayed on the control panel 11. When the user operates the language switching button, a list of languages is displayed on the control panel 11. The user selects the desired language from the displayed list of the languages. For example, when the user can understand Japanese, Japanese is selected. Also, when the user desires English, English is selected. When a command for starting the job is input by the user, for example, when a job start button is operated, a language relating to the job is determined.

A job managing section 12 manages jobs which have been ordered by the user(s) through the control panel 11. As described above, the image processing apparatus 10 realizes the multitask function for processing plural jobs such as copying, printing and scanning, in parallel. For this purpose, the job managing section 12 manages plural jobs to be processed in parallel. Moreover, in this exemplary embodiment, the job managing section 12 manages the plural jobs so that each job is associated with the language information relating to each job. For example, when the languages corresponding to the jobs are determined by the operation through the control panel 11, the job managing section 12 generates a job list by associating the determined languages with the jobs, and stores the job list in a data storage section 13.

FIG. 2 is a view for explaining a job list 60 which is generated by the job managing section 12 and stored in the data storage section 13. The job list 60 shows a list of the jobs (active jobs), which are being processed by the image processing apparatus 10 in parallel at present.

"JOB NUMBER" is the number affixed to each job, and "JOB TYPE" means a type of each job. Moreover, "USER'S NAME" shows a user who ordered each job, and "LANGUAGE" shows a language associated with each job. For example, the job of the job number 002 is a scanning job ordered by a user B, and English is associated with this job. Although three jobs of the job numbers 001 to 003 are shown in FIG. 2, the active jobs may be four or more, or less than three.

Returning to FIG. 1, the job managing section 12 adequately controls the job processing section 14 based on the job list 60 (FIG. 2), to thereby realize the multitask function for processing the plural active jobs in parallel. In this exemplary embodiment, in processing of the jobs, the display information relating to each job can be displayed in the language corresponding to each job.

For example, it is assumed that in the job list 60 shown in FIG. 2, the print job of the job number 001 is being processed by the printing module (which serves as a print output section) of the job processing section 14 shown in FIG. 1, and that the scanning job of the job number 002 is being processed by the reading module (which serves as the image input section) of the job processing section 14 in parallel with the print job of the job number 001.

In this case, when some error occurs in the printing module of the job processing section 14, that is, when an error relating to the print job of the job number 001 occurs, a display processing section 15 shown in FIG. 1 generates an error message in the language associated with the print job of the job number 001, that is, in Japanese. Then, the generated error message is displayed on the control panel 11. Also, when an error relating to the scanning job of the job number 002 occurs, for example, due to a document jam during the scanning function being carried out in the image input section, an error message is generated in English associated with the scanning job of the job number 002. Further, when a mechanical trouble happens in the communication control section 17 shown in FIG. 1, jobs which are influenced by this trouble includes the print job of the job number 001 for receiving the print job through the communication control section 17, and the fax transmitting job of the job number 003 for transmitting a facsimile through the communication control section 17. In this case, error messages having the same contents are generated in Japanese and Chinese which are the languages associated with the job number 001 and the job number 003, respectively.

As described above, in this exemplary embodiment, when an error occurs in jobs among plural jobs which are being processed in a multitask manner, it is possible to display error messages in languages corresponding to the jobs, that is, in languages desired by users who has ordered the jobs. Therefore, even if another language is set in the image processing device 10 at a time when the error occurs, the error message is displayed in the language corresponding to the job which causes the error.

It is also possible to generate a screen for displaying a progress of a process (processes) relating to the job, in place of or in addition to the error message. In this case, the progress display screen relating to a certain job is also displayed in a language corresponding to the certain job.

As described hereinabove, the image processing apparatus 10 can be used as a stand-alone apparatus. Further, in this exemplary embodiment, the image processing apparatus 10 can be used as a member of the system, by connecting the image processing apparatus 10 to the client PC 20, the print server 30, the authentication server 40, and so on.

In the system as shown in FIG. 1, the user can instruct the image processing apparatus 10 by way of the client PC 20 to conduct a process such as printing and faxing. Further, when the user instructs the image processing apparatus 10 through the client PC 20 to conduct a printing process or the like, user authentication is carried out using the authentication server 40 for the purpose of preventing information leakage which is caused by leaving a printed material.

For example, when the user instructs the image processing apparatus 10 to conduct the print job using the client PC 20, the print job is transmitted to the print server 30 and held in the print server 30. In other words, the print job is not immediately processed by the image processing apparatus 10, but is temporarily held in the print server 30.

When the user wants to cause the image processing apparatus 10 to carry out the print job, which is temporarily held in the print server 30, the user moves to a place where the image processing apparatus 10 is installed, and is subjected to user authentication using an IC card or the like for user authentication or appropriately using the control panel 11 of the image processing apparatus 10.

For example, an IC reading device of the image processing apparatus 10, which is not shown, reads contents of the IC card, and confirms a user ID or the like of the user who possesses the IC card. The authentication processing section 16 of the image processing apparatus 10 obtains user information corresponding to the user ID from the authentication server 40 through the network 50, and confirms as to whether or not the user ID is an ID for a user who has been formally registered. When the authentication processing section 16 confirms that he/she is a user who has been formally registered, the user is authenticated for log-in, and the print job held in the print server 30 is carried out by the image processing apparatus 10 according to the operation of the user. When plural print jobs relating to the same user are held in the print server 30, a list of the print jobs is displayed on the control panel 11 of the image processing apparatus 10, and the user can select a desired print job.

When the print job is carried out after the user has been authenticated as described above, the image processing apparatus 10 associates each job with the language using language information contained in the user information obtained from the authentication server 40. For example, when user information of a formal user is registered in the authentication server 40, language information of a language which is desired by the user is included in the user information and registered in advance. When the authentication processing section 16 obtains the user information corresponding to the user ID from the authentication server 40 and confirms as to whether or not the user ID is an ID for a user who has been formally registered, the authentication processing section 16 also confirms the language information contained in the user information. Then, the print job is selected according to the operation of the authenticated user, the job managing section 12 generates the job list 60 similar to the one shown in FIG. 2, by associating the print job with the language contained in the user information. It is possible to eliminate the user's operation for selecting a language, by associating the job with the language using the language information contained in the user information.

In the same manner as in the case where the image processing apparatus is used as a stand-alone apparatus, when the print job is carried out after the user authentication process is performed and when an error occurs in a certain job of the plural jobs which are being processed in a multitask manner, it is possible to display an error message in a language corresponding to the certain job, that is, in a language desired by the user who instructs the certain job.

In a state where plural jobs corresponding to different languages are being processed in a multitask manner, when an error occurs in one of the plural jobs, the error message may be displayed in all the languages corresponding to the plural jobs which are the active jobs at that moment. Further, the error message may be displayed in the language corresponding to the job in which the error occurs, together with (i) a language corresponding to a user who is authenticated certified and logs in the image processing apparatus 10 at the time point when the error occurs, (ii) a language which is set by a user who is operating the control panel 11 of the image processing apparatus 10 or (iii) a language which is set as default in the image processing apparatus 10. Thereby, even if a person other than the user of the job in which the error occurs finds the displayed error message, the other person can understand contents of the error message. In a usual use state, the number of jobs being concurrently processed in parallel is 2 or 3, and the number of users who log in is limited. Therefore, as compared with the case where the message is displayed in all the languages that the image processing apparatus 10 has, a message in unnecessary languages can be eliminated.

Moreover, when the print job or the faxing job is output from the client PC 20, a printer driver or the like of the client PC 20 may designate a language, and the image processing apparatus 10 may associate each job with a language according to the language designation. Further, the image processing apparatus 10 may associate each job with a language, using OS information (OS in Japanese, OS in English, etc.). Alternatively, a field in which a user can optionally designate a language may be provided for the language designation. In this manner, even if the language information is not contained in the user information supplied from the authentication server 40, it is possible to eliminate the language switching operation that is performed by the user using the control panel 11.

The image processing apparatus 10 shown in FIG. 1 has the hardware configuration of a computer such as a CPU, memory, hard disk, and so on. The hardware configuration cooperates with software (program) for realizing the functions of the image processing apparatus 10 to thereby realize the respective functions of the control panel 11, the job managing section 12, the data storage section 13, the job processing section 14, the display processing section 15, the authentication processing section 16, and the communication control section 17. For example, when the CPU operating according to the program utilizes the memory, the functions of the control panel 11, the job managing section 12, the data storage section 13, the job processing section 14, the display processing section 15, the authentication processing section 16, and the communication control section 17 are realized. Moreover, the hard disk or the memory, for example, may function as the data storage section 13.

Further, the program for realizing the functions of the image processing apparatus 10 may be stored in a recording medium such as an optical disk, and may be read into the image processing apparatus 10 through the recording medium, or may be supplied to the image processing apparatus 10 through the network 50.

Although the exemplary embodiments of the invention have been heretofore described, the above described exemplary embodiments are just examples in all respects, but do not limit the scope of the invention. The invention includes all types of modifications so long as the modifications don't deviate from the spirit of the invention.

What is claimed is:

1. An image processing apparatus having a function of processing a plurality of jobs in parallel, the image processing apparatus comprising:
   an authentication processing section that authenticates a user who operates a control panel of the image processing apparatus to process a first job among the plurality of jobs;
   a job processing section that processes in parallel the first job and a second job among the plurality of jobs;

a language information receiving section that receives a first language of the authenticated user and a second language of the second job;

a job managing section that manages the plurality of jobs while associating the first job with the first language and associating the second job with the second language; and a display controlling section that displays a message relating to processing of one of the first job and the second job in the first language and the second language.

2. The image processing apparatus according to claim 1, wherein the language information receiving section includes the control panel that receives the first language from the user.

3. The image processing apparatus according to claim 1, wherein the language information receiving section includes a communication control section that receives the first language from an external information processing apparatus.

4. The image processing apparatus according to claim 3, wherein the authentication processing section that authenticates the user using user information obtained from an authentication server, wherein the language information receiving section receives the first language from the user information obtained from the authentication server, and the job managing section associates the first language contained in the user information with the first job.

5. The image processing apparatus according to claim 1, wherein when an error occurs in processing one of the first job and the second job, the display controlling section displays the message relating to the error in the first language and the second language.

6. The image processing apparatus according to claim 2, wherein when an error occurs in processing one of the first job and the second job, the display controlling section displays the message relating to the error in the first language and the second language.

7. The image processing apparatus according to claim 1, wherein the message is a progress of processing one of the first job and the second job.

8. An image processing method comprising:
authenticating a user who operates a control panel of an image processing apparatus to process a first job among a plurality of jobs;
processing in parallel the first job and a second job among the plurality of jobs;
receiving a first language of the authenticated user and a second language of the second job;
managing the plural jobs while associating the first job with the first language and associating the second job with the second language; and
displaying a message relating to processing one of the first job and the second job in the first language and the second language.

9. The method according to claim 8, wherein the receiving comprises receiving the first language information relating to each job through the control panel from the user.

10. The method according to claim 9, further comprising:
when an error occurs in processing one of the first job and the second job, displaying the message relating to the error in the first language and the second language.

11. A non-transitory computer-readable medium storing a program causing a computer to execute image processing, the image processing comprising:

authenticating a user who operates a control panel of an image processing apparatus to process a first job among a plurality of jobs;
processing in parallel the first job and a second job among the plurality of jobs;
receiving a first language of the authenticated user and a second language of the second job;
managing the plural jobs while associating the first job with the first language and associating the second job with the second language; and
displaying a message relating to processing one of the first job and the second job in the first language and the second language.

12. The non-transitory computer-readable medium according to claim 11, wherein the receiving comprises receiving the first language information relating to each job through the control panel from the user.

13. The non-transitory computer-readable medium according to claim 12, wherein the image processing further comprises:
when an error occurs in processing one of the first job and the second job, displaying the message relating to the error in the first language and the second language.

14. An image processing apparatus having a function of processing a plurality of jobs in parallel, the plurality of jobs comprising a first job, a second job, and a third job, the image processing apparatus comprising:
a first image forming device that processes jobs of a first type and a second image forming device that processes jobs of a second job type;
processor that controls operations of the image processing apparatus;
a language information receiving section that receives first language information of the first job, second language information of the second job, and third language information of the third job;
a job managing section that manages the plurality of jobs while associating the first job with the first language information and the first job type, the second job with the second language information and the first job type, and the third job with the third language and the second job type; and
a display that displays display information,
wherein when an error occurs in the first forming device, the processor determines that the first forming device processes jobs of the first type, and in response to determining that the first forming device processes the jobs of the first type, controls the display to display an error in the first language of the first job having the determined first job type and the second language of the second job having the determined first job type.

15. The image processing apparatus according to claim 14, wherein the image processing apparatus is a multi-function device.

16. The image processing apparatus according to claim 15, wherein the first image forming device comprises one of a scanner, a fax, and a copier, and
wherein the second image forming device comprises one of the scanner, the fax, and the copier that is different from the first image forming device.

* * * * *